(12) United States Patent
Sun et al.

(10) Patent No.: US 9,505,930 B2
(45) Date of Patent: Nov. 29, 2016

(54) LOW GLOSS THERMOPLASTIC COMPOSITIONS, METHOD OF MANUFACTURE THEREOF AND ARTICLES COMPRISING THE SAME

(71) Applicant: SABIC Global Technologies B.V., Bergen op Zoom (NL)

(72) Inventors: Bin Sun, Newburgh, IN (US); Stephen L. Taylor, Ottawa, IL (US); Douglas Warren Howie, Jr., Evansville, IN (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 0 days.

(21) Appl. No.: 14/793,971

(22) Filed: Jul. 8, 2015

(65) Prior Publication Data

US 2016/0009915 A1    Jan. 14, 2016

Related U.S. Application Data

(60) Provisional application No. 62/023,412, filed on Jul. 11, 2014.

(51) Int. Cl.
| | |
|---|---|
| C08G 63/48 | (2006.01) |
| C08L 69/00 | (2006.01) |
| C08L 33/12 | (2006.01) |
| C08G 63/91 | (2006.01) |

(52) U.S. Cl.
CPC .............. C08L 69/00 (2013.01); C08L 33/12 (2013.01); C08L 2205/025 (2013.01); C08L 2205/03 (2013.01); C08L 2205/035 (2013.01); C08L 2207/04 (2013.01)

(58) Field of Classification Search
CPC ...................................................... C08L 33/12
USPC ......................................................... 525/68
See application file for complete search history.

(56) References Cited

U.S. PATENT DOCUMENTS

| | | | |
|---|---|---|---|
| 4,579,909 A | 4/1986 | Giles, Jr. | |
| 5,354,796 A * | 10/1994 | Creecy | C08L 55/02 524/114 |
| 5,580,924 A | 12/1996 | Wildi et al. | |
| 7,514,523 B2 * | 4/2009 | Chen | C08L 69/00 428/411.1 |
| 7,649,057 B2 * | 1/2010 | DeRudder | C08L 69/00 525/101 |
| 7,683,131 B2 | 3/2010 | Goldacker | |
| 7,728,056 B2 | 6/2010 | Kuvshinnikova | |
| 8,222,350 B2 * | 7/2012 | DeRudder | C08L 69/00 524/261 |
| 2006/0252883 A1 | 11/2006 | Berzinis | |
| 2007/0010618 A1 | 1/2007 | Chen et al. | |
| 2007/0135589 A1 | 6/2007 | DeRudder et al. | |
| 2010/0075165 A1 | 3/2010 | Cho | |
| 2012/0108751 A1 | 5/2012 | Van Rheenen | |

FOREIGN PATENT DOCUMENTS

| | | |
|---|---|---|
| CN | 101486825 A | 7/2009 |
| CN | 102532849 A | 7/2012 |
| WO | WO2006005090 A1 | 1/2006 |

OTHER PUBLICATIONS

M. S. Kang, C. K. Kim and J. W. Lee, "PC/ASA blends having enhanced interfacial and mechanical properties" Korea-Australia Rheology Journal, vol. 18, No. 1, Mar. 2006 pp. 1-8.

Mohammad Reza Moghbeli and Shima Tolue, "Acrylonitrile/Styrene/Acrylate Structural Rubber Latex Particles as Impact Modifier for SAN Copolymer" Iranian Polymer Journal, 20 (2), 2011,137-146.

S.A. Edwards, et al. "Probing the interface behaviour of injection molded thermoplastics by micro-thermal analysis and temperature-modulated differential scanning calorimetry" Polymer, vol. 44, No. 13 Jun. 2003; 3661-3670.

Y. S. Seo, et al. "Polycarbonate/acrylonitrile-styrene-acrylic elastomer terpolymer blends with enhanced interfacial adhesion and surface gloss" J. Appl. Polym. Sci., 96: 2097-2104 (2005).

International Search Report for International Application No. PCT/US2015/039503, International Filing Date Jul. 8, 2015, Date of Mailing Sep. 11, 2015, 4 pages.

Written Opinion for International Application No. PCT/US2015/039503, International Filing Date Jul. 8, 2015, Date of Mailing Sep. 11, 2015, 7 pages.

* cited by examiner

Primary Examiner — Terressa Boykin
(74) Attorney, Agent, or Firm — Cantor Colburn LLP

(57) ABSTRACT

Disclosed herein is a composition comprising a polycarbonate; a copolymer derived from a copolymerization of a vinyl aromatic monomer and an ethylenically unsaturated nitrile monomer; an impact modifier that comprises acrylonitrile-styrene-acrylate; a first gel-type low gloss additive; where the first gel-type low gloss additive is an epoxy cross-linked styrene acrylonitrile dispersed in polycarbonate; a second gel-type low gloss additive; where the second gel-type low gloss additive is an epoxy cross-linked styrene acrylonitrile dispersed in polystyrene; a first polymethylmethacrylate; and a second polymethylmethacrylate; where the first polymethylmethacrylate and the second polymethylmethacrylate are present in a total amount of 1 to 25 wt %, based on the total weight of the composition; and wherein the first polymethylmethacrylate has a higher weight average molecular weight than the second polymethylmethacrylate.

16 Claims, 3 Drawing Sheets

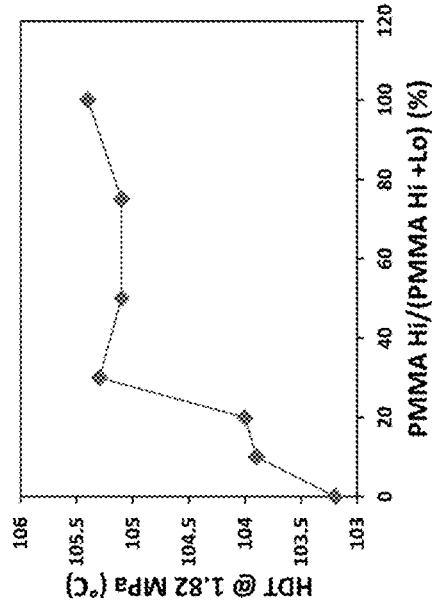
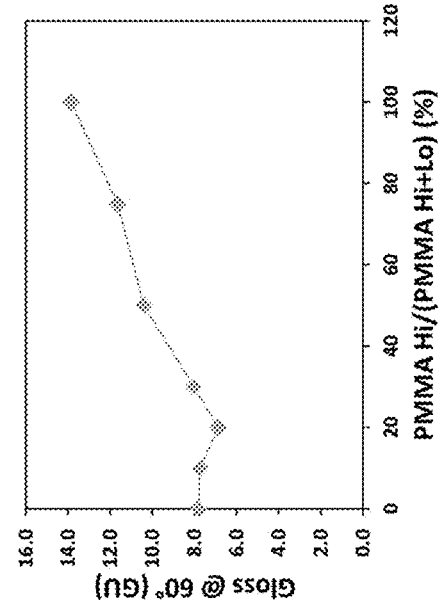
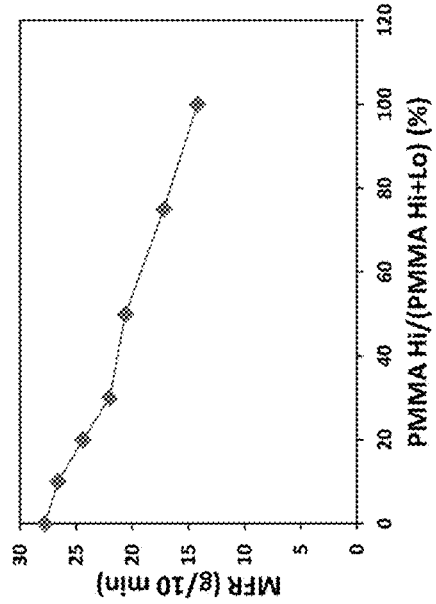
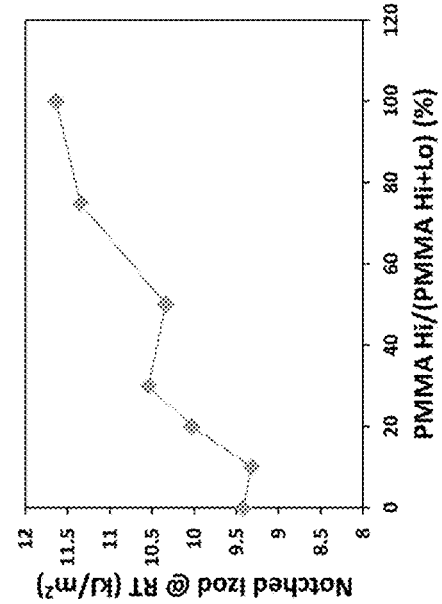
FIG. 2A
FIG. 2B
FIG. 2C
FIG. 2D
FIG. 2

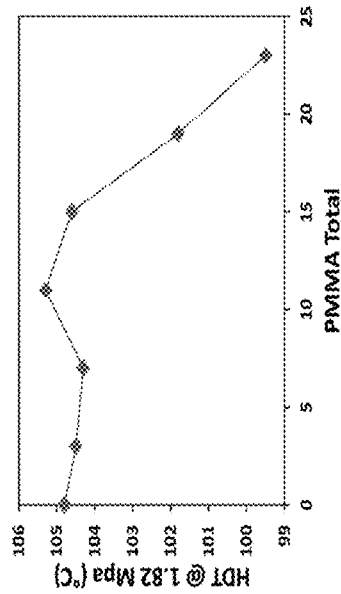
FIG. 3A
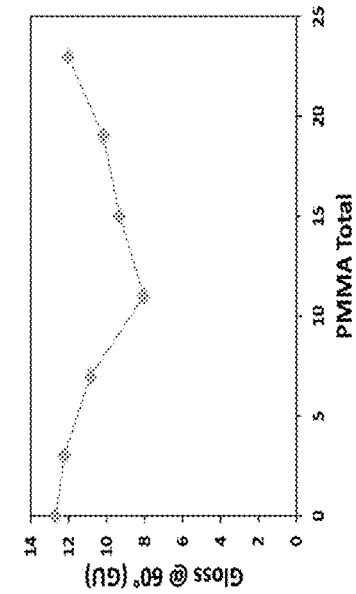
FIG. 3B
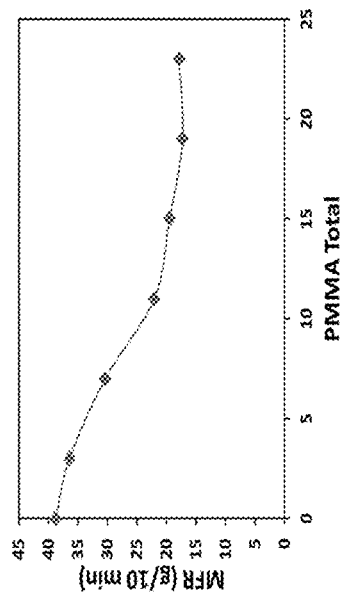
FIG. 3C
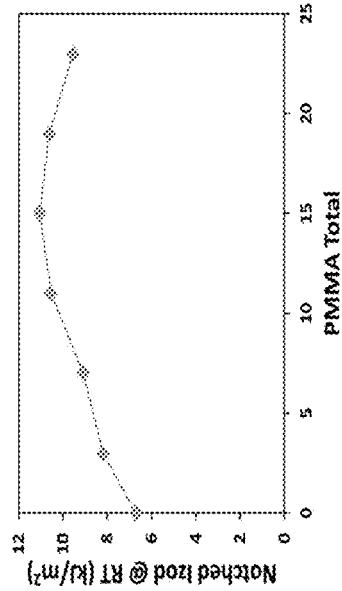
FIG. 3D
FIG. 3

LOW GLOSS THERMOPLASTIC COMPOSITIONS, METHOD OF MANUFACTURE THEREOF AND ARTICLES COMPRISING THE SAME

CROSS REFERENCE TO RELATED APPLICATIONS

This US Non-Provisional Application claims the benefit of U.S. Provisional Application Ser. No. 62/023,412, filed 11 Jul. 2014, the entire contents of which are hereby incorporated by reference.

BACKGROUND

This disclosure relates to low gloss thermoplastic compositions, methods of manufacture thereof and to articles comprising the same. In particular, this disclosure relates to compositions that have low gloss and that contain polycarbonate and acrylonitrile-styrene-acrylates.

It is desirable for certain components used in automobiles to have a low gloss. For example, in automotive rearview mirror housings, a high gloss polycarbonate (PC)-acrylonitrile-styrene-acrylate (ASA) grade is generally used, which demands an additional secondary mechanical operation such as blast treatment to reduce the gloss and to produce a low gloss surface finish. This additional secondary mechanical operation is both time consuming and expensive.

Crosslinked gel concentrates have often been used as low gloss additives for thermoplastic resins. For example, polyepoxides are reacted with polymers containing nitrile groups (e.g., a styrene-acrylonitrile copolymer) to produce crosslinked concentrates that can be added to thermoplastic polymers to reduce gloss. The concentrates of low gloss additives dispersed in polycarbonate or polystyrene resin were blended further with high gloss acrylonitrile-butadiene-styrene (ABS) or polycarbonate-acrylonitrile-butadiene-styrene (PC/ABS) resin mixtures in order to produce ABS-based thermoplastic blends having an inherent matte or low gloss surface finish.

However, the direct addition of the low gloss concentrates to an existing high gloss PC/ASA composition does not produce the desired low gloss characteristics and surface aesthetics. It is therefore desirable to manufacture compositions that comprise polycarbonate and that display low gloss and suitable aesthetics.

SUMMARY

Disclosed herein is a composition comprising a polycarbonate; a copolymer derived from a copolymerization of a vinyl aromatic monomer and an ethylenically unsaturated nitrile monomer; an impact modifier that comprises acrylonitrile-styrene-acrylate; a first gel-type low gloss additive; where the first gel-type low gloss additive is an epoxy cross-linked styrene acrylonitrile dispersed in polycarbonate; a second gel-type low gloss additive; where the second gel-type low gloss additive is an epoxy cross-linked styrene acrylonitrile dispersed in polystyrene; a first polymethylmethacrylate; and a second polymethylmethacrylate; where the first polymethylmethacrylate and the second polymethylmethacrylate are present in a total amount of 1 to 25 wt %, based on the total weight of the composition; and wherein a weight ratio of the first polymethylmethacrylate to a total weight of the first polymethylmethacrylate and the second polymethylmethacrylate is 0.2 to 1.0; and where the first polymethylmethacrylate has a higher weight average molecular weight than the second polymethylmethacrylate.

Disclosed herein too is a method comprising blending a composition comprising a polycarbonate; a copolymer derived from a copolymerization of a vinyl aromatic monomer and an ethylenically unsaturated nitrile monomer; an impact modifier that comprises acrylonitrile-styrene-acrylate; a first gel-type low gloss additive; where the first gel-type low gloss additive is an epoxy cross-linked styrene acrylonitrile dispersed in polycarbonate; a second gel-type low gloss additive; where the second gel-type low gloss additive is an epoxy cross-linked styrene acrylonitrile dispersed in polystyrene; a first polymethylmethacrylate; and a second polymethylmethacrylate; where the first polymethylmethacrylate and the second polymethylmethacrylate are present in a total amount of 1 to 25 wt %, based on the total weight of the composition; and wherein a weight ratio of the first polymethylmethacrylate to a total weight of the first polymethylmethacrylate and the second polymethylmethacrylate is 0.2 to 1.0; and where the first polymethylmethacrylate has a higher weight average molecular weight than the second polymethylmethacrylate.

BRIEF DESCRIPTION OF THE FIGURES

FIG. 2A shows a graph that depicts melt flow rate at different ratios of PMMA Hi to PMMA total (0 to 100%) at a fixed PMMA total content of 11 wt % in the thermoplastic composition;

FIG. 2B shows a graph that depicts heat distortion temperature at different ratios of PMMA Hi to PMMA total (0 to 100%) at a fixed PMMA total content of 11 wt % in the thermoplastic composition;

FIG. 2C shows a graph that depicts notched Izod impact at different ratios of PMMA Hi to PMMA total (0 to 100%) at a fixed PMMA total content of 11 wt % in the thermoplastic composition;

FIG. 2D shows a graph that depicts 60 degree gloss at different ratios of PMMA Hi to PMMA total (0 to 100%) at a fixed PMMA total content of 11 wt % in the thermoplastic composition;

FIG. 3A shows a graph that depicts melt flow rate at a PMMA Hi to PMMA total of 30% but where total PMMA content was varied from 0 to 23 wt % based on the total weight of the thermoplastic composition;

FIG. 3B shows a graph that depicts heat distortion temperature at a PMMA Hi to PMMA total of 30% but where total PMMA content was varied from 0 to 23 wt % based on the total weight of the thermoplastic composition;

FIG. 3C shows a graph that depicts notched Izod impact strength at a PMMA Hi to PMMA total of 30% but where total PMMA content was varied from 0 to 23 wt % based on the total weight of the thermoplastic composition; and FIG. 3D shows a graph that depicts 60 degree gloss at a PMMA Hi to PMMA total of 30% but where total PMMA content was varied from 0 to 23 wt % based on the total weight of the thermoplastic composition.

DETAILED DESCRIPTION

Figure 1:
FIG. 1 shows photographs comparing gloss levels and surface aesthetics for samples E2 through E4 on un-textured molded color chips.

Disclosed herein is a thermoplastic composition that produces a low gloss and that has good aesthetics. The composition comprises polycarbonate, a styrene-acrylonitrile copolymer, an acrylonitrile-styrene-acrylate rubber graft, a high molecular weight polymethylmethacrylate and a low molecular weight polymethylmethacrylate. It has been inadvertently discovered that by using 1 to 25 wt %, specifically 7 to 15 wt % of a combination of high molecular weight and low molecular weight polymethylmethacrylate in the composition in combination with a total weight of a first low gloss additive (Matt 1) and a second low gloss additive (Matt 2) in an amount of at least 7.0 wt % produces a low gloss composition with good aesthetics. In one embodiment, a low gloss composition with good aesthetics can be produced when the ratio of high molecular weight polymethylmethacrylate to the total weight of the high and low molecular weights polymethylmethacrylates is varied from 0.2 to 1.0, specifically 0.3 to 0.7, and more specifically 0.4 to 0.6. By using a higher ratio of the high molecular weight polymethylmethacrylate to the total weight of the high and low molecular weight polymethylmethacrylates, good aesthetics can be produced in addition to low gloss.

"Polycarbonate" as used herein means a polymer having repeating structural carbonate units of formula (1)

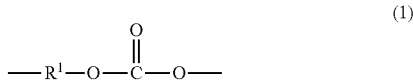

(1)

in which at least 60 percent of the total number of $R^1$ groups contain aromatic moieties and the balance thereof are aliphatic, alicyclic, or aromatic. In an embodiment, each $R^1$ is a $C_{6-30}$ aromatic group, that is, contains at least one aromatic moiety. $R^1$ can be derived from an aromatic dihydroxy compound of the formula HO—$R^1$—OH, in particular of formula (2)

$$HO\text{-}A^1\text{-}Y^1\text{-}A^2\text{-}OH \quad (2)$$

wherein each of $A^1$ and $A^2$ is a monocyclic divalent aromatic group and $Y^1$ is a single bond or a bridging group having one or more atoms that separate $A^1$ from $A^2$. In an embodiment, one atom separates $A^1$ from $A^2$. Specifically, each $R^1$ can be derived from a bisphenol of formula (3)

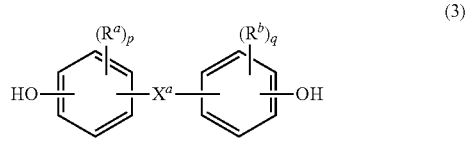

(3)

wherein $R^a$ and $R^b$ are each independently a halogen, $C_{1-12}$ alkoxy, or $C_{1-12}$ alkyl, and p and q are each independently integers of 0 to 4. It will be understood that when p or q is less than 4, the valence of each carbon of the ring is filled by hydrogen. Also in formula (3), $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an embodiment, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group.

In an embodiment, p and q is each 1, and $R^a$ and $R^b$ are each a $C_{1-3}$ alkyl group, specifically methyl, disposed meta to the hydroxy group on each arylene group.

In an embodiment, $X^a$ is a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene.

In another embodiment, $X^a$ is a $C_{1-18}$ alkylene, a $C_{3-18}$ cycloalkylene, a fused $C_{6-18}$ cycloalkylene, or a group of the formula —$B^1$-G-$B^2$— wherein $B^1$ and $B^2$ are the same or different $C_{1-6}$ alkylene and G is a $C_{3-12}$ cycloalkylidene or a $C_{6-16}$ arylene. For example, $X^a$ can be a substituted $C_{3-18}$ cycloalkylidene of formula (4)

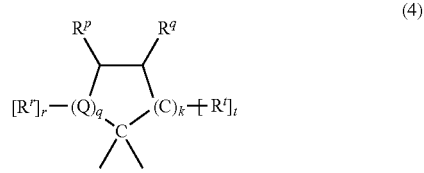

(4)

wherein $R^r$, $R^p$, $R^q$, and $R^t$ are each independently hydrogen, halogen, oxygen, or $C_{1-12}$ hydrocarbon groups; Q is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; r is 0 to 2, t is 1 or 2, q is 0 or 1, and k is 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (4) will have an unsaturated carbon-carbon linkage where the ring is fused. When k is one and i is 0, the ring as shown in formula (4) contains 4 carbon atoms, when k is 2, the ring as shown in formula (4) contains 5 carbon atoms, and when k is 3, the ring contains 6 carbon atoms. In an embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Bisphenols wherein $X^a$ is a cycloalkylidene of formula (4) can be used in the manufacture of polycarbonates containing phthalimidine carbonate units of formula (5a)

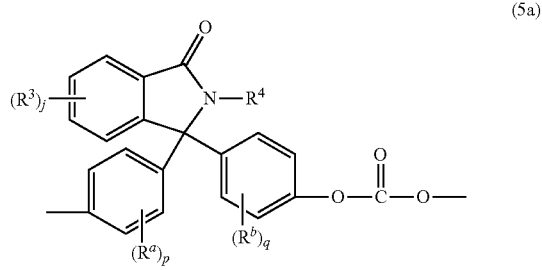

(5a)

wherein $R^a$, $R^b$, p, and q are as in formula (3), $R^3$ is each independently a $C_{1-6}$ alkyl, j is 0 to 4, and $R_4$ is hydrogen, $C_{1-6}$ alkyl, or a substituted or unsubstituted phenyl, for example a phenyl substituted with up to five $C_{1-6}$ alkyls. For example, the phthalimidine carbonate units are of formula (5b)

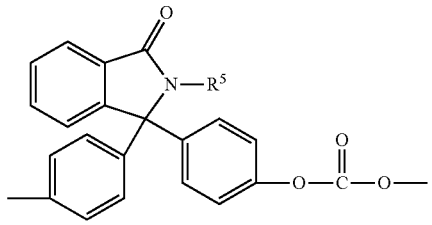

(5b)

wherein $R^5$ is hydrogen, phenyl optionally substituted with up to five 5 $C_{1-6}$ alkyls, or $C_{1-4}$ alkyl. In an embodiment in formula (1b), $R^5$ is hydrogen, methyl, or phenyl, specifically phenyl. Carbonate units (1b) wherein $R^5$ is phenyl can be derived from 2-phenyl-3,3'-bis(4-hydroxy phenyl)phthalimidine (also known as 3,3-bis(4-hydroxyphenyl)-2-phenylisoindolin-1-one, or N-phenyl phenolphthalein bisphenol ("PPPBP")).

Other bisphenol carbonate repeating units of this type are the isatin carbonate units of formula (5c) and (5d)

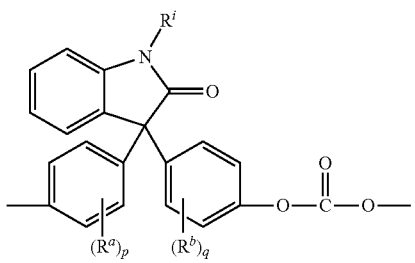

(5c)

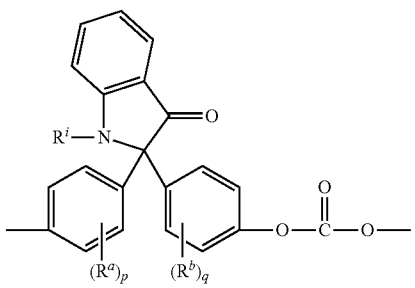

(5d)

wherein $R^a$ and $R^b$ are each independently a halogen, $C_{1-12}$ alkoxy, or $C_{1-12}$ alkyl, p and q are each independently 0 to 4, and $R^i$ is $C_{1-12}$ alkyl, phenyl optionally substituted with 1 to 5 $C_{1-10}$ alkyl, or benzyl optionally substituted with 1 to 5 $C_{1-10}$ alkyl. In an embodiment, $R^a$ and $R^b$ are each methyl, p and q are each independently 0 or 1, and $R^i$ is $C_{1-4}$ alkyl or phenyl.

Other examples of bisphenol carbonate units derived from of bisphenols (3) wherein $X^a$ is a substituted or unsubstituted $C_{3-18}$ cycloalkylidene (4) include the cyclohexylidene-bridged, alkyl-substituted bisphenol of formula (5e)

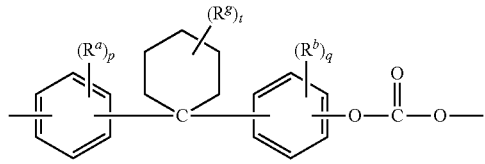

(5e)

wherein $R^a$ and $R^b$ are each independently $C_{1-12}$ alkyl, $R^g$ is $C_{1-12}$ alkyl, p and q are each independently 0 to 4, and t is 0 to 10. In a specific embodiment, at least one of each of $R^a$ and $R^b$ are disposed meta to the cyclohexylidene bridging group. In an embodiment, $R^a$ and $R^b$ are each independently $C_{1-4}$ alkyl, $R^g$ is $C_{1-4}$ alkyl, p and q are each 0 or 1, and t is 0 to 5. In another specific embodiment, $R^a$, $R^b$, and $R^g$ are each methyl, p and q are each 0 or 1, and t is 0 or 3, specifically 0.

Examples of other bisphenol carbonate units derived from bisphenol (3) wherein $X^a$ is a substituted or unsubstituted $C_{3-18}$ cycloalkylidene include adamantyl units of formula (5f) and fluorenyl units of formula (5g)

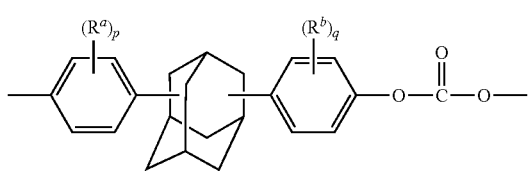

(5f)

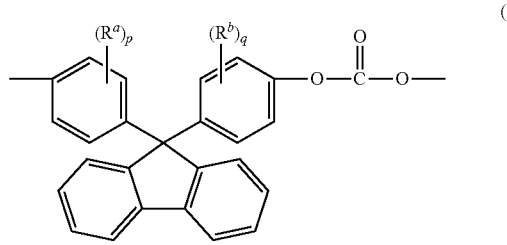

(5g)

wherein $R^a$ and $R^b$ are each independently $C_{1-12}$ alkyl, and p and q are each independently 1 to 4. In a specific embodiment, at least one of each of $R^a$ and $R^b$ are disposed meta to the cycloalkylidene bridging group. In an embodiment, $R^a$ and $R^b$ are each independently $C_{1-3}$ alkyl, and p and q are each 0 or 1; specifically, $R^a$, $R^b$ are each methyl, p and q are each 0 or 1, and when p and q are 1, the methyl group is disposed meta to the cycloalkylidene bridging group. Carbonates containing units (5a) to (5g) are useful for making polycarbonates with high glass transition temperatures (Tg) and high heat distortion temperatures.

Other useful dihydroxy compounds of the formula HO—$R^1$—OH include aromatic dihydroxy compounds of formula (6)

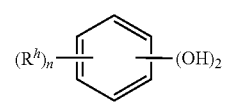

(6)

wherein each $R^h$ is independently a halogen atom, $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4. The halogen is usually bromine.

Some illustrative examples of specific dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycolbis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds of formula (3) include 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-2-methylphenyl)propane, 1,1-bis(4-hydroxy-t-butylphenyl)propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used. In a specific embodiment, the polycarbonate is a linear homopolymer derived from bisphenol A, in which each of $A^1$ and $A^2$ is p-phenylene and $Y^1$ is isopropylidene in formula (3).

The polycarbonates can have an intrinsic viscosity, as determined in chloroform at 25° C., of 0.3 to 1.5 deciliters per gram (dl/gm), specifically 0.45 to 1.0 dl/gm. The polycarbonates can have a weight average molecular weight of 10,000 to 200,000 Daltons, specifically 20,000 to 100,000 Daltons, as measured by gel permeation chromatography (GPC), using a crosslinked styrene-divinylbenzene column and calibrated to polycarbonate references. GPC samples are prepared at a concentration of 1 mg per ml, and are eluted at a flow rate of 1.5 ml per minute.

In an embodiment, the polycarbonate has flow properties useful for the manufacture of thin articles. Melt flow rate (often abbreviated MFR) measures the rate of extrusion of a thermoplastic through an orifice at a prescribed temperature and load. Combinations of polycarbonates of different flow properties can be used to achieve the overall desired flow property. A high molecular weight aromatic polycarbonate having a relatively high weight average molecular weight can be combined with a relatively low molecular weight aromatic polycarbonate, with a difference of 1,000 to 50,000, specifically 2,000 to 25,000 g/mol. For example, a high molecular weight aromatic polycarbonate having a weight average molecular weight of 27,000 to 100,000 can be combined with a relatively low molecular weight aromatic polycarbonate having a weight average molecular weight of less than 27,000, for example 15,000 to 25,000.

In one embodiment, two or more polycarbonate homopolymers may be used together. When two or more polycarbonate homopolymers are used (i.e., a first polycarbonate homopolymer and a second polycarbonate homopolymer), the first polycarbonate homopolymer has a higher weight average molecular weight than the second polycarbonate homopolymer. The polycarbonate homopolymer having the lower molecular weight is called the high flow polycarbonate because it has a lower viscosity and can be processed using less shear and pressure that the higher molecular weight polycarbonate.

When two polycarbonate homopolymers are used, the first polycarbonate homopolymer is used in an amount of 10 to 50 wt %, specifically 12 to 35 wt %, based on the total weight of the composition. The second polycarbonate homopolymer is used in an amount of 10 to 30 wt %, specifically 15 to 28 wt %, based on the total weight of the composition.

The total weight of the polycarbonate homopolymer is an amount of 30 to 80 weight percent (wt %), specifically 40 to 75 wt % specifically 45 to 70 wt % and more specifically 50 to 68 wt %, based on the total weight of the composition.

"Polycarbonates" includes homopolycarbonates (wherein each $R^1$ in the polymer is the same), copolymers comprising different $R^1$ moieties in the carbonate ("copolycarbonates"), and copolymers comprising carbonate units and other types of polymer units, such as ester units or siloxane units.

A specific type of copolymer is a poly(ester-carbonate), also known as a polyester-polycarbonate. Such copolymers further contain, in addition to recurring carbonate units of formula (1), repeating units of formula (7)

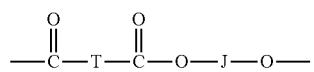

(7)

wherein J is a divalent group derived from a dihydroxy compound (including a reactive derivative thereof), and can be, for example, a $C_{2-10}$ alkylene, a $C_{6-20}$ cycloalkylene, a $C_{6-20}$ arylene, or a polyoxyalkylene in which the alkylene groups contain 2 to 6 carbon atoms, specifically 2, 3, or 4 carbon atoms; and T is a divalent group derived from a dicarboxylic acid (including a reactive derivative thereof), and can be, for example, a $C_{2-20}$ alkylene, a $C_{6-20}$ cycloalkylene, or a $C_{6-20}$ arylene. Copolyesters containing a combination of different T and/or J groups can be used. The polyester units can be branched or linear.

In an embodiment, J is a $C_{2-30}$ alkylene group having a straight chain, branched chain, or cyclic (including polycyclic) structure, for example ethylene, n-propylene, i-propylene, 1,4-butylene, 1,6-cyclohexylene, or 1,4-methylenecyclohexane. In another embodiment, J is derived from a bisphenol of formula (3), e.g., bisphenol A. In another embodiment, J is derived from an aromatic dihydroxy compound of formula (6), e.g., resorcinol.

Aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, or a combination comprising at least one of the foregoing acids. Acids containing fused rings can also be present, such as in 1,4-, 1,5-, or 2,6-naphthalenedicarboxylic acids. Specific dicarboxylic acids include terephthalic acid, isophthalic acid, naphthalene dicarboxylic acid, 1,4-cyclohexane dicarboxylic acid, or a combination comprising at least one of the foregoing acids. A specific dicarboxylic acid comprises a combination of isophthalic acid and terephthalic acid wherein the weight ratio of isophthalic acid to terephthalic acid is 91:9 to 2:98.

Specific ester units include ethylene terephthalate, n-propylene terephthalate, n-butylene terephthalate, 1,4-cyclohexanedimethylene terephthalate, and ester units derived from isophthalic acid, terephthalic acid, and resorcinol (ITR). The molar ratio of ester units to carbonate units in the copolymers can vary broadly, for example 1:99 to 99:1, specifically 10:90 to 90:10, more specifically 25:75 to 75:25, or 2:98 to 15:85, depending on the desired properties of the final composition. Specific poly(ester-carbonate)s are those including bisphenol A carbonate units and isophthalate-terephthalate-bisphenol A ester units, also commonly referred to as poly(carbonate-ester)s (PCE) poly(phthalate-carbonate)s (PPC) depending on the molar ratio of carbonate units and ester units.

In a specific embodiment, the polycarbonate copolymer is a poly(bisphenol A carbonate)-co-(bisphenol A-phthalate-ester) of formula (8a)

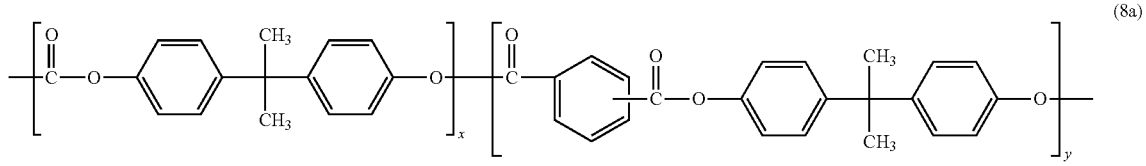

wherein y and x represent the weight percent of arylate-bisphenol A ester units and bisphenol A carbonate units, respectively. Generally, the units are present as blocks. In an embodiment, the weight percent of ester units y to carbonate units x in the copolymers is 50:50 to 99:1, or 55:45 to 90:10, or 75:25 to 95:5. Copolymers of formula (8a) comprising 35 to 45 wt. % of carbonate units and 55 to 65 wt. % of ester units, wherein the ester units have a molar ratio of isophthalate to terephthalate of 45:55 to 55:45 are often referred to as poly(carbonate-ester)s (PCE) and copolymers comprising 15 to 25 wt. % of carbonate units and 75 to 85 wt. % of ester units having a molar ratio of isophthalate to terephthalate from 98:2 to 88:12 are often referred to as poly(phthalate-carbonate)s (PPC).

In another embodiment, a specific polycarbonate copolymer is a poly(carbonate)-co-(monoaryl arylate ester) containing carbonate units (1) and repeating monoaryl arylate ester units of formula (8b)

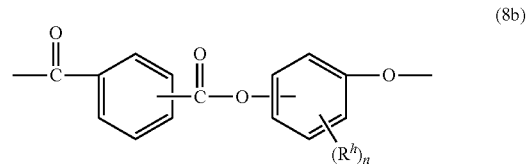

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. Specifically, each $R^h$ is independently a $C_{1-4}$ alkyl, and n is 0 to 3, 0 to 1, or 0. These poly(carbonate)-co-(monoaryl arylate ester) copolymers are of formula (8c)

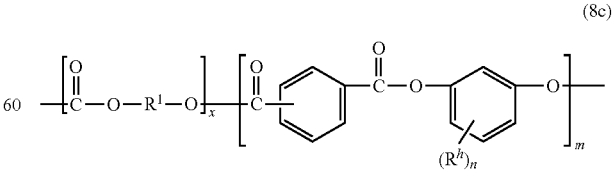

wherein $R^1$ is as defined in formula (1) and $R^h$, and n are as defined in formula (8b), and the mole ratio of x:m is 99:1 to 1:99, specifically 80:20 to 20:80, or 60:40 to 40:60.

Specifically, the monoaryl-arylate ester unit (8b) is derived from the reaction of a combination of isophthalic and terephthalic diacids (or derivatives thereof) with resorcinol (or reactive derivatives thereof) to provide isophthalate-terephthalate-resorcinol ("ITR" ester units) of formula (8d)

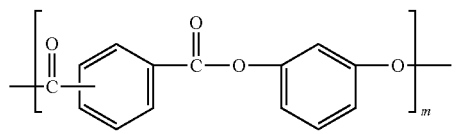

wherein m is 4 to 100, 4 to 90, 5 to 70, more specifically 5 to 50, or still more specifically 10 to 30. In an embodiment, the ITR ester units are present in the polycarbonate copolymer in an amount greater than or equal to 95 mol %, specifically greater than or equal to 99 mol %, and still more specifically greater than or equal to 99.5 mol % based on the total moles of ester units in the copolymer. Such (isophthalate-terephthalate-resorcinol)-carbonate copolymers ("ITR-PC") can possess many desired features, including toughness, transparency, and weatherability. ITR-PC copolymers can also have desirable thermal flow properties. In addition, ITR-PC copolymers can be readily manufactured on a commercial scale using interfacial polymerization techniques, which allow synthetic flexibility and composition specificity in the synthesis of the ITR-PC copolymers.

A specific example of a poly(carbonate)-co-(monoaryl arylate ester) is a poly(bisphenol A carbonate)-co-(isophthalate-terephthalate-resorcinol ester) of formula (8e)

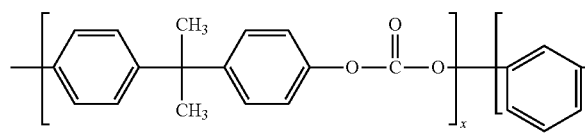

wherein m is 4 to 100, 4 to 90, 5 to 70, more specifically 5 to 50, or still more specifically 10 to 30, and the mole ratio of x:m is 99:1 to 1:99, specifically 90:10 to 10:90. The ITR ester units are present in the poly(carbonate-arylate ester) copolymer in an amount greater than or equal to 95 mol %, specifically greater than or equal to 99 mol %, and still more specifically greater than or equal to 99.5 mol % based on the total moles of ester units. Other carbonate units, other ester units, or a combination thereof can be present, in a total amount of 1 to 20 mole % based on the total moles of units in the copolymers, for example resorcinol carbonate units of formula (80 and bisphenol ester units of formula (8g):

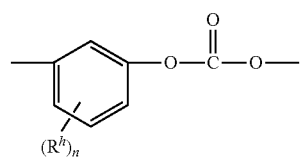

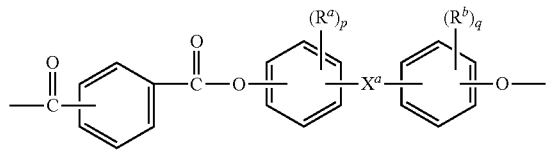

wherein, in the foregoing formulae, $R^h$ is each independently a $C_{1-10}$ hydrocarbon group, n is 0 to 4, $R^a$ and $R^b$ are each independently a $C_{1-12}$ alkyl, p and q are each independently integers of 0 to 4, and $X^a$ is a single bond, —O—, —S—, —S(O)—, —S(O)_2—, —C(O)—, or a $C_{1-13}$ alkylidene of formula —C($R^c$)($R^d$)— wherein $R^c$ and $R^d$ are each independently hydrogen or $C_{1-12}$ alkyl, or a group of the formula —C(=$R^e$)— wherein $R^e$ is a divalent $C_{1-12}$ hydrocarbon group. The bisphenol ester units can be bisphenol A phthalate ester units of the formula (9)

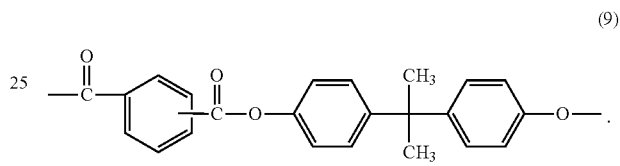

In an embodiment, poly(bisphenol A carbonate)-co-(isophthalate-terephthalate-resorcinol ester) (8c) comprises 1 to 20 mol % of bisphenol A carbonate units, 20-98 mol % of isophthalic acid-terephthalic acid-resorcinol ester units, and optionally 1 to 60 mol % of resorcinol carbonate units, isophthalic acid-terephthalic acid-bisphenol A phthalate ester units, or a combination thereof.

The polycarbonate copolymers comprising arylate ester units are generally prepared from polyester blocks. The polyester blocks can also be prepared by interfacial polymerization. Rather than utilizing the dicarboxylic acid or diol per se, the reactive derivatives of the acid or diol, such as the corresponding acid halides, in particular the acid dichlorides and the acid dibromides can be used. Thus, for example instead of using isophthalic acid, terephthalic acid, or a combination comprising at least one of the foregoing acids, isophthaloyl dichloride, terephthaloyl dichloride, or a combination comprising at least one of the foregoing dichlorides can be used. The polyesters can also be obtained by melt-process condensation as described above, by solution phase condensation, or by transesterification polymerization wherein, for example, a dialkyl ester such as dimethyl terephthalate can be transesterified with the dihydroxy reactant using acid catalysis, to generate the polyester blocks. Branched polyester blocks, in which a branching agent, for example, a glycol having three or more hydroxyl groups or a trifunctional or multifunctional carboxylic acid has been incorporated, can be used. Furthermore, it can be desirable to have various concentrations of acid and hydroxyl end groups on the polyester blocks, depending on the ultimate end use of the composition.

The polycarbonate copolymers comprising arylate ester units can have an $M_w$ of 2,000 to 100,000 g/mol, specifically 3,000 to 75,000 g/mol, more specifically 4,000 to 50,000 g/mol, more specifically 5,000 to 35,000 g/mol, and still more specifically 17,000 to 30,000 g/mol. Molecular weight determinations are performed using GPC using a cross linked styrene-divinyl benzene column, at a sample concentration of 1 milligram per milliliter, and as calibrated with polycarbonate standards. Samples are eluted at a flow rate of 1.0 ml/min with methylene chloride as the eluent.

A specific example of a poly(ester-carbonate) is a poly (aliphatic ester-carbonate derived from a linear $C_{6\text{-}20}$ aliphatic dicarboxylic acid (which includes a reactive derivative thereof), specifically a linear $C_6\text{-}C_{12}$ aliphatic dicarboxylic acid (which includes a reactive derivative thereof). Specific dicarboxylic acids include n-hexanedioic acid (adipic acid), n-decanedioic acid (sebacic acid), and alpha, omega-$C_{12}$ dicarboxylic acids such as dodecanedioic acid (DDDA). A specific poly(aliphatic ester)-polycarbonate is of formula (10):

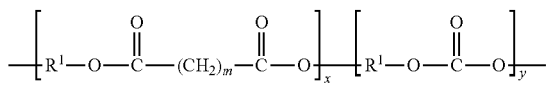

(10)

wherein each $R^1$ can be the same or different, and is as described in formula (1), m is 4 to 18, specifically 4 to 10, and the average molar ratio of ester units to carbonate units x:y is 99:1 to 1:99, including 13:87 to 2:98, or 9:91 to 2:98, or 8:92 to 2:98. In a specific embodiment, the poly(aliphatic ester)-polycarbonate copolymer comprises bisphenol A sebacate ester units and bisphenol A carbonate units, having, for example an average molar ratio of x:y of 2:98 to 8:92, for example 6:94. Such poly(aliphatic ester-carbonate)s are commercially available as LEXAN HFD from the Innovative Plastics Division of SABIC (LEXAN is a trademark of SABIC IP B. V.).

The poly(aliphatic ester-carbonate) can have a weight average molecular weight of 15,000 to 40,000 Dalton (Da), including 20,000 to 38,000 Da (measured by GPC based on BPA polycarbonate standards).

The total weight of the polyester-carbonate is an amount of 30 to 80 weight percent (wt %), specifically 40 to 75 wt % specifically 45 to 70 wt % and more specifically 50 to 68 wt %, based on the total weight of the composition.

The composition further comprises a copolymer that is derived from a vinyl aromatic monomer and a monoethylenically unsaturated nitrile monomers. Examples of vinyl aromatic monomers are styrene and substituted styrenes having one or more alkyl, alkoxy, hydroxy or halo substituent groups attached to the aromatic ring, including, but not limited to, alpha-methyl styrene, p-methyl styrene, 3,5-diethylstyrene, 4-n-propylstyrene, vinyl toluene, alpha-methyl vinyltoluene, vinyl xylene, trimethyl styrene, butyl styrene, t-butyl styrene, chloro styrene, alpha-chloro styrene, dichlorostyrene, tetrachlorostyrene, bromostyrene, alpha-bromostyrene, dibromostyrene, p-hydroxystyrene, p-acetoxystyrene, methoxystyrene or the like, of a combination comprising at least one of the foregoing vinyl aromatic monomers. An exemplary vinyl aromatic monomer is styrene. Examples of monoethylenically unsaturated nitrile monomers are acrylonitrile, ethacrylonitrile, methacrylonitrile, alpha-bromoacrylonitrile, alpha-chloro acrylonitrile, or the like, of a combination comprising at least one of the foregoing vinyl aromatic monomers. An exemplary monoethylenically unsaturated nitrile monomer is acrylonitrile. An exemplary copolymer derived from the vinyl aromatic monomer and the ethylenically unsaturated nitrile monomer is a styrene-acrylonitrile copolymer.

The styrene acrylonitrile copolymer generally comprises at least 2 wt %, specifically at least 4 wt % and more specifically at least 5 wt % of acrylonitrile, based on the total weight of the copolymer derived from the vinyl aromatic monomer and the ethylenically unsaturated nitrile monomer.

The copolymer derived from the vinyl aromatic monomer and the ethylenically unsaturated nitrile monomer is present in an amount of 2 to 20 wt %, specifically 3 to 7 wt %, and more specifically 4 to 6 wt %, based on the total weight of the composition. An exemplary copolymer derived from the copolymerization of the vinyl aromatic monomer and the ethylenically unsaturated nitrile monomer is CYCOLAC high flow styrene-acrylonitrile commercially available from SABIC Innovative Plastics.

The composition further comprises an impact modifier. The impact modifier comprises an elastomer (hereinafter termed a "rubber") that comprises a copolymer derived from a vinyl aromatic monomer, an ethylenically unsaturated nitrile monomer and an ethylenically unsaturated monomer that does not contain a nitrile monomer. In an exemplary embodiment, the ethylenically unsaturated monomer that does not contain a nitrile monomer is a monoethylenically unsaturated alkyl(meth)acrylate monomer.

The rubber comprises a discontinuous elastomeric phase and a rigid thermoplastic phase wherein at least a portion of the rigid thermoplastic phase is grafted to the elastomeric phase. Grafted rigid thermoplastic phase is sometimes referred to as the "shell" and the discontinuous rubber phase is sometimes referred to as the "core" in such compositions. The present invention employs at least one rubber substrate for grafting. The rubber substrate comprises the discontinuous elastomeric phase of the composition. There is no particular limitation on the rubber substrate provided it is susceptible to grafting by at least a portion of a graftable monomer. The rubber substrate has a glass transition temperature, Tg, in one embodiment below about 0° C., in another embodiment below about minus 20° C., and in still another embodiment below about minus 30° C.

In various embodiments the rubber substrate is derived from polymerization by known methods of at least one monoethylenically unsaturated alkyl(meth)acrylate monomer selected from ($C_1\text{-}C_{12}$)alkyl(meth)acrylate monomers and mixtures comprising at least one of said monomers. Examples of ($C_1\text{-}C_{12}$)alkyl(meth)acrylate monomers include ethyl acrylate, butyl acrylate, iso-pentyl acrylate, n-hexyl acrylate, and 2-ethyl hexyl acrylate; and their ($C_1\text{-}C_{12}$)alkyl methacrylate analogs illustrative examples of which include methyl methacrylate, ethyl methacrylate, propyl methacrylate, iso-propyl methacrylate, butyl methacrylate, hexyl methacrylate, and decyl methacrylate. In an exemplary embodiment, the rubber substrate comprises structural units derived from n-butyl acrylate.

In various embodiments the rubber substrate may also comprise structural units derived from at least one polyethylenically unsaturated monomer. As used herein, the terminology "polyethylenically unsaturated" means having two or more sites of ethylenic unsaturation per molecule. A polyethylenically unsaturated monomer is often employed to provide cross-linking of the rubber particles and to provide "graft-linking" sites in the rubber substrate for subsequent reaction with grafting monomers. Suitable polyethylenically unsaturated monomers include, but are not limited to, butylene diacrylate, divinyl benzene, butane diol dimethacrylate, trimethylolpropane tri(meth)acrylate, allyl methacrylate, diallyl methacrylate, diallyl maleate, diallyl fumarate, diallyl phthalate, triallyl methacrylate, triallylisocyanurate, triallylcyanurate, the acrylate of tricyclodecenylalcohol and mixtures comprising at least one of such monomers. In a particular embodiment the rubber substrate comprises structural units derived from triallylcyanurate.

In some embodiments the rubber substrate may optionally comprise structural units derived from minor amounts of other unsaturated monomers, for example those that are copolymerizable with an alkyl(meth)acrylate monomer used to prepare the rubber substrate. Suitable copolymerizable monomers include, but are not limited to, $C_1$-$C_{12}$ aryl or haloaryl substituted acrylate, $C_1$-$C_{12}$ aryl or haloaryl substituted methacrylate, or mixtures thereof; monoethylenically unsaturated carboxylic acids, such as, for example, acrylic acid, methacrylic acid, crotonic acid and itaconic acid; glycidyl(meth)acrylate, hydroxy alkyl(meth)acrylate, hydroxy($C_1$-$C_{12}$)alkyl(meth)acrylate, such as, for example, hydroxyethyl methacrylate; ($C_4$-$C_{12}$)cycloalkyl(meth)acrylate monomers, such as, for example, cyclohexyl methacrylate; (meth)acrylamide monomers, such as, for example, acrylamide, methacrylamide and N-substituted-acrylamide or -methacrylamides; maleimide monomers, such as, for example, maleimide, N-alkyl maleimides, N-aryl maleimides and haloaryl substituted maleimides; maleic anhydride; vinyl methyl ether, vinyl esters, such as, for example, vinyl acetate and vinyl propionate. As used herein, the term "(meth)acrylamide" refers collectively to acrylamides and methacrylamides. Suitable copolymerizable monomers also include, but are not limited to, vinyl aromatic monomers, such as, for example, styrene and substituted styrenes having one or more alkyl, alkoxy, hydroxy or halo substituent groups attached to the aromatic ring, including, but not limited to, alpha-methyl styrene, p-methyl styrene, 3,5-diethylstyrene, 4-n-propylstyrene, vinyl toluene, alpha-methyl vinyltoluene, vinyl xylene, trimethyl styrene, butyl styrene, t-butyl styrene, chlorostyrene, alpha-chlorostyrene, dichlorostyrene, tetrachlorostyrene, bromostyrene, alpha-bromostyrene, dibromostyrene, p-hydroxystyrene, p-acetoxystyrene, methoxystyrene and vinyl-substituted condensed aromatic ring structures, such as, for example, vinyl naphthalene, vinyl anthracene, as well as mixtures of vinyl aromatic monomers and monoethylenically unsaturated nitrile monomers such as, for example, acrylonitrile, ethacrylonitrile, methacrylonitrile, alpha-bromoacrylonitrile and alpha-chloro acrylonitrile.

Substituted styrenes with mixtures of substituents on the aromatic ring are also suitable. In one particular embodiment of the invention the rubber substrate is essentially free of any structural units derived from adding to the polymerization mixture any monoethylenically unsaturated carboxylic acids, such as, for example, acrylic acid, methacrylic acid, crotonic acid and itaconic acid. In the present context "essentially free of" means that any monoethylenically unsaturated carboxylic acids are present in monomers employed in synthesis of the rubber substrate only as adventitious impurities, typically at a level of less than about 1 wt. % or less than about 0.5 wt. % or less than about 0.2 wt. %.

The rigid thermoplastic phase comprises a thermoplastic polymer or copolymer that exhibits a glass transition temperature (Tg) in one embodiment of greater than about 25° C., in another embodiment of greater than or equal to 90° C., and in still another embodiment of greater than or equal to 100° C.

In a particular embodiment the rigid thermoplastic phase comprises a polymer having structural units derived from one or more monomers selected from the group consisting of ($C_1$-$C_{12}$)alkyl- and aryl-(meth)acrylate monomers, vinyl aromatic monomers and monoethylenically unsaturated nitrile monomers. Suitable ($C_1$-$C_{12}$)alkyl- and aryl-(meth)acrylate monomers, vinyl aromatic monomers and monoethylenically unsaturated nitrile monomers include those set forth hereinabove in the description of the rubber substrate. Examples of such polymers include, but are not limited to, a styrene/acrylonitrile copolymer, an alpha-methylstyrene/acrylonitrile copolymer, a styrene/methylmethacrylate copolymer, a styrene/maleic anhydride copolymer or an alpha-methylstyrene/styrene/acrylonitrile-, a styrene/acrylonitrile/methylmethacrylate-, a styrene/acrylonitrile/maleic anhydride- or a styrene/acrylonitrile/acrylic acid-terpolymer, or an alpha-methylstyrene/styrene/acrylonitrile terpolymer. These copolymers may be used for the rigid thermoplastic phase either individually or as mixtures.

In some embodiments the rigid thermoplastic phase comprises one or more vinyl aromatic polymers. Suitable vinyl aromatic polymers comprise at least about 20 wt. % structural units derived from one or more vinyl aromatic monomers. In a particular embodiment the rigid thermoplastic phase comprises a vinyl aromatic polymer having first structural units derived from one or more vinyl aromatic monomers and having second structural units derived from one or more monoethylenically unsaturated nitrile monomers.

Examples of such vinyl aromatic polymers include, but are not limited to, a styrene/acrylonitrile copolymer, an alpha-methylstyrene/acrylonitrile copolymer, or an alpha-methylstyrene/styrene/acrylonitrile terpolymer. In another particular embodiment the rigid thermoplastic phase comprises a vinyl aromatic polymer having first structural units derived from one or more vinyl aromatic monomers; second structural units derived from one or more monoethylenically unsaturated nitrile monomers; and third structural units derived from one or more monomers selected from the group consisting of ($C_1$-$C_{12}$)alkyl- and aryl-(meth)acrylate monomers. Examples of such vinyl aromatic polymers include, but are not limited to, styrene/acrylonitrile/methyl methacrylate copolymer and alpha-methylstyrene/acrylonitrile/methyl methacrylate copolymer. These copolymers may be used for the rigid thermoplastic phase either individually or as mixtures. An exemplary rigid thermoplastic phase is a styrene acrylonitrile copolymer.

When structural units in copolymers are derived from one or more monoethylenically unsaturated nitrile monomers, then the nitrile monomer content in the copolymer comprising the graft copolymer and the rigid thermoplastic phase may be in one embodiment in a range of between about 5 and about 40 percent by weight, in another embodiment in a range of between about 5 and about 30 percent by weight, in another embodiment in a range of between about 10 and about 30 percent by weight, and in yet another embodiment in a range of between about 15 and about 30 percent by weight, based on the weight of the copolymer comprising the graft copolymer and the rigid thermoplastic phase.

The impact modifier is present in an amount of 8.7 to 39 wt %, specifically 9 to 25 wt %, based on the total weight of the composition. An exemplary impact modifier is CYCOLAC 29350 1000 powder commercially available from SABIC Innovative Plastics.

In some embodiments, the composition further comprises a gel-type low gloss additive. An example of a suitable low gloss additive comprises the reaction product of a polyepoxide and a polymer comprising an ethylenically unsaturated nitrile, and can further comprise a non-reactive carrier, such as polycarbonate or polystyrene. The components are reactively combined at elevated temperature to form the low gloss additive. Suitable low gloss additives and methods of preparing them are known in the art, and are disclosed, for example, in U.S. Pat. Nos. 5,530,062; 5,336,701; 5,026,777; 5,580,924; and 5,965,665 which are incorporated herein by reference.

Polyepoxides which are suitable for use in preparing low gloss additives include simple aliphatic diepoxides such as dodecatriene dioxide, dipentene dioxide and 1,2,7,8-diepoxyoctane; bis-glycidyl ethers/esters such as the bisglycidyl ether of bisphenol A and its condensation products; alicyclic diepoxides such as 3,4-epoxycyclohexyl 3,4-epoxycyclohexanecarboxylate and bis(3,4-epoxycyclohexylmethyl) adipate; mixed aliphatic/alicyclic diepoxides such as vinylcyclobutene dioxide, vinylcyclopentadiene dioxide and butenylcyclopentene dioxide; glycidyl ethers of novolak resins; epoxidized heterocycles such as triglycidyl isocyanurate; and epoxidized oils such as epoxidized tall oil, linseed oil and soybean oil; combinations comprising one or more of the foregoing; and the like. Specifically suitable polyepoxides are alicyclic polyepoxides such as 3,4-epoxycyclohexyl 3,4-epoxycyclohexylcarboxylate, available under the trade name ERL-4221 from Dow or 2021-P from Daicel.

The first and second gel-type low gloss additive (Matt 1 and Matt 2, respectively), if present in the composition, is present in a total amount of up to 12 wt %. More specifically, the gel-type low gloss additive is present in the composition in an amount of from 6 wt % to 9 wt %. The first gel-type low gloss additive (Matt 1) is an epoxy cross linked styrene acrylonitrile dispersed in polycarbonate. The second gel-type low gloss additive (Matt 2) is an epoxy cross-linked styrene acrylonitrile dispersed in polystyrene. The use of a combination of the first and second gel-type low gloss additive in the composition allows low gloss and gloss uniformity as the first gel-type low gloss additive is preferentially dispersed in the polycarbonate phase while the second gel-type low gloss additive is preferentially dispersed in the acrylonitrile-styrene-acrylate and the styrene-acrylonitrile phase.

The composition further comprises a first polymethylmethacrylate and a second polymethylmethacrylate. Both polymethylmethacrylates function as processing aids. In one embodiment, at least one of the first polymethylmethacrylate or the second polymethylmethacrylate is a homopolymer, while the other is a copolymer.

In one embodiment, the first polymethylmethacrylate is a random copolymer or a block copolymer derived by reacting a monomer represented by formula (11):

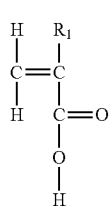

(11)

where $R_1$ in the formula (11) is a hydrogen or an alkyl group having 1 to 10 carbon atoms; with a monomer having a structure represented by the formula (12):

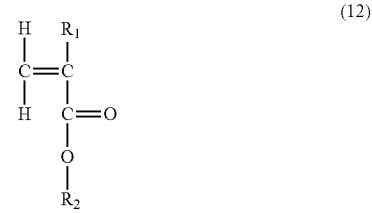

(12)

where $R_1$ in the formula (12) is a hydrogen or an alkyl group having 1 to 10 carbon atoms and $R_2$ is a $C_{1-10}$ alkyl, a $C_{3-10}$ cycloalkyl, or a $C_{7-10}$ aralkyl group.

In one embodiment, the first polymethylmethacrylate is a copolymer of polymethylmethacrylate and polyethylacrylate or a copolymer of polymethylmethacrylate and polybutylacrylate. In an exemplary embodiment, the first polymethylmethacrylate is a copolymer of polymethylmethacrylate and polybutylacrylate and has a higher molecular weight and melt viscosity than the second polymethylmethacrylate.

The first polymethylmethacrylate is generally referred to as a high molecular weight polymethylmethacrylate and is used in amounts of 0.5 to 18 wt % based on the total weight of the composition. Examples of the first polymethylmethacrylate are KANE ACE PA-20 commercially available from Kaneka Corporation (referred to in the Examples as PMMA Hi-1) and METABLEN P 552 commercially available from Arkema (referred to in the Examples as PMMA Hi-2). The higher molecular weight polymethylmethacrylates (copolymers) can have a number molecular average weight of 200,000 to 10,000,000, specifically 200,000 to 5,000,000 and weight average molecular weight of 200,000 to 10,000,000 Daltons, specifically 300,000 to 5,000,000 Daltons, as measured by gel permeation chromatography (GPC), using a crosslinked styrene-divinylbenzene column and calibrated to polystyrene references. GPC samples are prepared at a concentration of 1 mg per ml, and are eluted at a flow rate of 1.5 ml per minute.

The second polymethylmethacrylate comprises polymethylmethacrylate homopolymer and has a lower melt viscosity (i.e., a lower molecular weight) than the first polymethylmethacrylate. The second polymethylmethacrylate is referred to as a low molecular weight polymethylmethacrylate and is commercially available from Cyro Industries as ACRYLITE H12 (referred to in the Examples as PMMA Lo-1) or from Arkema as PLEXIGLASS VLD 100 (referred to in the Examples as PMMA Lo-2). The second polymethylmethacrylate is present in an amount of 0.5 to 20 wt % based on the total weight of the composition. The lower molecular weight polymethylmethacrylates can have a number molecular weight of 20,000 to 60,000, specifically 40,000 to 60,000 and weight average molecular weight of 60,000 to 100,000 Daltons, specifically 70,000 to 100,000 Daltons, as measured by gel permeation chromatography (GPC), using a crosslinked styrene-divinylbenzene column and calibrated to polystyrene references. GPC samples are prepared at a concentration of 1 mg per ml, and are eluted at a flow rate of 1.5 ml per minute.

The first and the second polymethylmethacrylate are present in the composition in a total amount of 1 to 25 wt %, specifically in amounts of 2, 3, 4, 5, 6 or 7 wt % up to amounts of 15, 16, 17, 18, 19, 20, 21, 22, 23 or 24 wt %, based on the total weight of the composition.

The weight ratio of high molecular weight polymethylmethacrylate (the first polymethylmethacrylate) to the total weight of high molecular weight polymethylmethacrylate (the first polymethylmethacrylate) and low molecular weight polymethylmethacrylate (the second polymethylmethacrylate) varies in an amount of 0.2 to 1.0, specifically 0.3 to 0.7, and more specifically 0.4 to 0.6.

In an embodiment, the composition is manufactured by blending the ingredients listed above. The blending can be dry blending, melt blending, solution blending, or a combination comprising at least one of the foregoing forms of blending.

In an embodiment, the composition can be dry blended to form a mixture in a device such as a Henschel mixer or a Waring blender prior to being fed to an extruder, where the mixture is melt blended. Blending of the composition involves the use of shear force, extensional force, compressive force, ultrasonic energy, electromagnetic energy, thermal energy or combinations comprising at least one of the foregoing forces or forms of energy and is conducted in processing equipment wherein the aforementioned forces are exerted by a single screw, multiple screws, intermeshing co-rotating or counter rotating screws, non-intermeshing co-rotating or counter rotating screws, reciprocating screws, screws with pins, barrels with pins, rolls, rams, helical rotors, or combinations comprising at least one of the foregoing.

Blending involving the aforementioned forces may be conducted in machines such as single or multiple screw extruders, Buss kneader, Henschel, helicones, Ross mixer, Banbury, roll mills, molding machines such as injection molding machines, vacuum forming machines, blow molding machine, or then like, or combinations comprising at least one of the foregoing machines.

The composition can be introduced into the melt blending device in the form of a masterbatch. For example, a portion of the composition can be pre-blended with some of the ingredients to form a masterbatch, which is then blended with the remaining ingredients to form the composition. In such a process, the masterbatch may be introduced into the blending device downstream of the point where the remaining ingredients of the composition is introduced.

In an embodiment, the composition disclosed herein is used to prepare molded articles such as for example, durable articles, electrical and electronic components, automotive parts, and the like. The compositions can be converted to articles using common thermoplastic processes such as film and sheet extrusion, injection molding, gas-assisted injection molding, extrusion molding, compression molding and blow molding.

The composition may be used in the manufacture of a variety of different articles where low gloss is desired. These articles include automobile parts, decorative furnishings, computers, electronic goods, parts for aircraft, and the like.

The composition is exemplified by the following non-limiting examples.

EXAMPLES

Example 1

The following example was conducted using a design of experiments (DOE) methodology. The experiment was conducted to pin point the factors (those components of the composition that have an impact on the gloss of the composition). The example will now be discussed in detail.

To provide insights into the influence of individual components in the low gloss PC/ASA composition, a two-level fractional factorial design of experiment (DOE) (i.e., Resolution III; $2^{10-6}$; 2 added center points; 18 run total) was conducted to evaluate the main effects of individual components (i.e., factors) of the composition on properties that are critical to quality (i.e., responses).

Table 1 lists the detailed individual components used for the low gloss PC/ASA composition in this study as well as the suppliers of these components. Table 2 lists the factors (A-K) used to construct the design including the ranges of components defined in this study, while Table 3 lists the responses (Y) investigated in the DOE. We note here that the probability of color chip surface that is free from blemishes and surface splay (Y5) is listed as continuous data, which was transformed using statistical software (e.g., Minitab) based upon binary discrete data collected by visually rating as-molded color chips as either "good" or "bad" with regards to surface splay.

TABLE 1

| # | Item | Description | Supplier | Tradename |
|---|------|-------------|----------|-----------|
| 1 | PC1 | 100 grade polycarbonate homopolymer with an absolute Mw of 29,900 | SABIC-IP | LEXAN* ML4505-111 Resin |
| 2 | PC2 | High flow polycarbonate homopolymer with an absolute Mw of 21,900 | SABIC-IP | LEXAN* ML5221-111 Resin |
| 3 | SAN1 | Styrene-acrylonitrile copolymer, 25% acrylonitrile | SABIC-IP | CYCOLAC* HIGH FLOW SAN Resin |
| 4 | SAN2 | Bulk Styrene-acrylonitrile copolymer | SABIC-IP | CYCOLAC* SAN 581 Resin |
| 5 | ASA | Acrylonitrile-styrene-acrylate high rubber graft | SABIC-IP | CYCOLAC* 29350 1000 Resin Powder |
| 6 | Matt1 | Epoxy-crosslinked SAN gel dispersed in polycarbonate | SABIC-IP | RESIN MAT 895 |
| 7 | Matt2 | Epoxy-crosslinked SAN gel dispersed in polystyrene | SABIC-IP | 29287-1000 Resin |
| 8 | PMMA Hi-1 | PMMA Processing Aid with EA co-monomer | KANEKA | KANE ACE PA-20 Resin |
| 9 | PMMA Hi-2 | PMMA Processing Aid with BA co-monomer | ARKEMA | METABLEN P-552 Resin |
| 10 | PMMA Lo-1 | ACRYLITE H12 F7900 | CYRO Industries | ACRYLITE H12 Resin |

TABLE 1-continued

| # | Item | Description | Supplier | Tradename |
|---|---|---|---|---|
| 11 | PMMA Lo-2 | PMMA, Plexiglass V920A | ARKEMA | PLEXIGLAS VLD 100 Resin |
| 12 | STAB | Tris(2,4-di-t-butylphenyl)phosphite | CIBA/BASF | Irgafos 168 |
| 13 | MR | Mold release, pentaerythritol tetrastearate | LONZA Spa | Glycolube P |

TABLE 2

| Factor | Name | Units | Type | Low Actual | High Actual |
|---|---|---|---|---|---|
| A | % SAN1 Type | % | Numeric | 0 | 100 |
| B | SAN + ASA Total | % | Numeric | 15 | 45 |
| C | SAN/(ASA + SAN) ratio | % | Numeric | 13 | 42 |
| D | % PMMA Hi-1 Type | % | Numeric | 0 | 100 |
| E | % PMMA Lo-1 Type | % | Numeric | 0 | 100 |
| F | PMMA Total | % | Numeric | 11 | 25 |
| G | PMMA Hi/(PMMA Hi + PMMA Lo) Ratio | % | Numeric | 20 | 30 |
| H | Matt Total | % | Numeric | 6 | 12 |
| J | Matt1/(Matt1 + Matt 2) Ratio | % | Numeric | 40 | 60 |
| K | PC1/(PC1 + PC2) Ratio | % | Numeric | 0 | 100 |

TABLE 3

| Response | Name | Units |
|---|---|---|
| Y1 | Textured Gloss @ 60° | GU |
| Y2 | Un-textured Gloss @ 60° | GU |
| Y3 | Un-textured Gloss STD | GU |
| Y4 | MFR | g/10 min |
| Y5 | Probability of Splay-Free Surface | — |
| Y6 | HDT @ 0.45 MPa | ° C. |
| Y7 | HDT @ 1.82 MPa | ° C. |
| Y8 | Impact Strength, Izod @ 23° C. | kJ/m$^2$ |

The ingredients shown for the respective compositions below were blended in a twin screw extruder according to the conditions shown in the Table 4 and were injection molded according to the conditions shown in the Table 5. For experiments designed to evaluate the effects of investigated factors on the surface aesthetics on molded color chips, extruded pellets were molded without drying for 4 hours at 107° C. to maximize the surface splay effects.

TABLE 4

| Parameters | Units | Settings |
|---|---|---|
| Compounder Type | NONE | WP 30 mm |
| Barrel Size | mm | 30 mm |
| Die | mm | 2 holes |
| Zone 1 Temp | ° C. | 177 |
| Zone 2 Temp | ° C. | 232 |
| Zone 3 Temp | ° C. | 260 |
| Zone 4 Temp | ° C. | 274 |
| Zone 5 Temp | ° C. | 274 |
| Zone 6 Temp | ° C. | 274 |
| Zone 7 Temp | ° C. | 274 |
| Screw speed | rpm | 500 |
| Throughput | kg/hr | 30 |
| Torque | None | 71-73 |
| Vacuum | MPa | −0.085 |

TABLE 5

| Parameter | Unit | Settings |
|---|---|---|
| Pre-drying time | Hour | 4 |
| Pre-drying temp | ° C. | 107 |
| Zone 1 temp | ° C. | 274 |
| Zone 2 temp | ° C. | 274 |
| Zone 3 temp | ° C. | 274 |
| Nozzle temp | ° C. | 274 |
| Mold temp | ° C. | 77 |
| Screw speed | rpm | 100 |
| Back pressure | psi | 75 |
| Cooling time | seconds | 18 |
| Injection speed(inch/s) | inch/s | 2 |
| Holding pressure | psi | 1000 |
| Max. Injection pressure | psi | 1000 |

Table 6 summarizes the analyzed effects of investigated factors on the responses based upon plotted Pareto charts for each response in the Design Expert software. The extents of factor influences on the responses were rated as "strong positive, ++"; "minor positive, +"; "minor negative, −"; "strong negative, −−", and "minimal effect, blank". For example, as expected, "Matt total" exhibited strong positive influence on both gloss and textured gloss with increasing content in the composition. The use of SAN1 type and increased amount of PC2 led to enhanced melt flow properties (e.g., ISO MFR) due to high flow (i.e., lower molecular weight) characteristics of SAN1 and PC2. In addition, there were either minimal or no effect at all of the PMMA Hi type (1 or 2) and PMMA Lo type (1 or 2) on all tested properties and no major differences were observed for the different suppliers (of these materials), while the increase in the ratio of SAN to the combined amount of SAN and ASA (total amount of SAN and ASA) and resulting decreases in ASA exerted positive impacts on melt flow but negative effects on the impact.

However, some unexpected results were also uncovered in this DOE study. For example, there is a positive influence of the ratio of PMMA Hi to PMMA total on the probability of splay-free surface, whereas the increase in the total amount of PMMA exhibited strong negative effects on most responses (e.g., gloss, HDT, and impact).

The Pareto chart results summarized in Table 6 highlights some of the unexpected results that are of particular significance to provide insights into the composition designs for property optimization that could otherwise be impossible based on a common knowledge of the ingredients.

Table 7 summarizes the effects of factors and recommendations from DOE to the selection of component composition and type for the low gloss PC/ASA composition. For example, high flow version of SAN (SAN1) was selected for further investigation due to its improvement on MFR and surface aesthetics. As a result of minor and no effects of types of PMMA Hi and Lo on the tested properties, PMMA Hi-2 and PMMA Lo-1 were used, while the unexpected positive influence of ratios of PMMA Hi to PMMA total led to setting the percentage at 30%.

In addition, Matt 1 to Matt total ratio (Matt 1+Matt 2) was chosen at 50% due to minor effects observed within the trial ranges, whereas high flow version (PC2) was selected resulting from its major improvement on MFR.

TABLE 6

| Factor | Textured Gloss | Gloss | ISO MFR | Surface Aesthetics | HDT 0.45 MPa | HDT 1.82 MPa | N Izod Impact |
|---|---|---|---|---|---|---|---|
| SAN1 vs SAN2 | − | − | ++ | + | | | − |
| SAN + ASA Total | −− | −− | | | −− | −− | |
| SAN/(ASA + SAN) Ratio | − | − | ++ | | | | −− |
| PMMA Hi-1 vs Hi-2 | | − | | | | | − |
| PMMA Lo-1 vs Lo-2 | | | | | | | |
| PMMA Total | −− | −− | | | −− | −− | −− |
| PMMA Hi/(PMMA Hi + PMMA Lo) Ratio | − | | | + | | | − |
| Matt Total | ++ | ++ | − | − | − | − | −− |
| Matt1/(Matt1 + Matt2) Ratio | + | | | | | | |
| PC2/(PC1 + PC2) Ratio | | | ++ | | − | | −− |

TABLE 7

| Factor | Recommendations from DOE |
|---|---|
| SAN1 vs SAN2 Type | 1. Minor Negative Effects on Gloss and Impact<br>2. Improvement on MFR and Aesthetics - Fixed on SAN1 |
| SAN + HRG Total | Negative Effects on Tested Properties |
| SAN/(HRG + SAN) Ratio | 1. Negative Effects on Gloss and Impact<br>2. Improvement on MFR |
| PMMA Hi-1 vs. Hi-2 Type | Minor Negative Effects on Gloss - Fixed on PMMA Hi-2 |
| PMMA Lo-1 vs. Lo-2 Type | No Effects on Properties - Fixed on PMMA Lo-1 |
| PMMA Total | Negative Effects on Tested Properties |
| PMMA Hi/(PMMA Hi + PMMA Lo) Ratio | Improvement on Aesthetics - Fixed at 30% |
| Matt Total | 1. Improvement on Gloss<br>2. Negative Impact on Other Properties |
| Matt1/(Matt1 + Matt2) Ratio | Minor Effects within Trial Ranges - Fixed at 50% |
| PC2/(PC1 + PC2) Ratio | 1. Minor Negative Effect on HDT<br>2. Negative Effect on Izod Impact<br>3. Major Improvement on MFR - Fixed on PC2 |

Based upon the results and recommendations from DOE and corresponding Pareto chart, we next sought to optimize and balance the properties that are critical to quality via the Design Expert software.

Table 8 lists the detailed compositions of comparative examples studied in this disclosure in weight percents. Samples E1 and E2 are two examples of low gloss PC/ASA composition recommended by property optimization conducted using the Design Expert software, while E3 is an exemplary low gloss composition developed previously with the direct addition of low gloss additives in the existing commercialized PC/ASA composition without the low gloss additives (E4), which was included in the study for property comparison.

TABLE 8

| Item | E1 | E2 | E3 | E4 |
|---|---|---|---|---|
| PC1 | 30.2 | | 26.51 | 31.44 |
| PC2 | 37.59 | 66.24 | 14.27 | 13.48 |
| SAN1 | 2.92 | 5.48 | | |
| SAN2 | | | 9.52 | 12.93 |
| ASA | 12.03 | 9.48 | 22.2 | 21.99 |
| Matt1 | 2.99 | 3.76 | 4.53 | |
| Matt2 | 2.99 | 3.76 | 4.53 | |
| PMMA Hi-2 | 3.29 | 3.29 | 4.53 | 4.99 |
| PMMA Lo-1 | 7.68 | 7.68 | 13.59 | 14.82 |
| STAB | 0.18 | 0.18 | 0.18 | 0.2 |
| MR | 0.14 | 0.14 | 0.14 | 0.15 |

Table 9 lists the property comparison for these exemplary compositions E1-E4. The composition for E1 is generated in the software via minimizing the gloss, maximizing the probability of splay-free surface as well as maximizing the HDT, MFR, and impact, whereas the E2 composition was obtained using the criteria of minimizing the gloss and maximizing only the probability of splay-free surface and MFR.

As shown in Table 8, E1 and E2 generally contain a higher PC content as compared to E3 and E4 (~65% vs. ~40%). In addition, more importantly, E1 and E2 contain lower total amounts of PMMA (~11% vs. ~19%) and higher ratios of PMMA Hi to PMMA total versus E3 and E4 (30% vs. 25%).

From assessing the rearview mirror housing parts produced at customer trials, as expected, the gloss levels decreased with increases in the Matt total contents (e.g., from E1 to E3). As a result, the customer excluded E1 from further evaluation. However, the parts produced using E3 exhibited surface splay that is undesirable because of surface aesthetics despite the lower gloss level as compared to E2, which in contrast demonstrated superior surface aesthetics with minimal splay. The trial results are consistent with the striking differences in the predicted probability of splay-free surface from the DOE (e.g., 0.76 vs. 0.14 for E2 and E3, respectively), also as evidenced by the comparison of surface appearance between E2 and E3 on un-textured molded color chips (see FIG. 1).

The improved surface aesthetics as demonstrated by E2 over E3 were the result of higher ratio of PMMA Hi to PMMA total (30% vs. 25%) and/or lower Matt total content (7.5% vs. 9.0%), as revealed by the Pareto chart summary (Table 4) of the unexpected DOE results as discussed above. The higher heat (HDT and Vicat) and the superior flow properties (MFR) of E2 versus E3 were the direct results of higher PC content (66% vs. 40%) and the use of SAN1 and only the high flow version PC2 in E2. The low gloss E2 composition yielded a substantially lower gloss level as compared to the high gloss control, E4 (27 vs. 94 gloss units (GU)), as measured on the un-textured surfaces of molded color chips (FIG. 1). In addition, the low gloss E2 composition resulted in a gloss level 5% lower as compared to the high gloss control, E4, as measured on textured surfaces on finished parts produced at customer trials. We note here that the lower gloss as measured on un-textured surfaces of molded color chips does not necessarily result in lower gloss level on textured surfaces.

that just increasing the amount of PMMA total exhibits strong negative effects on most responses (e.g., gloss, HDT, and impact).

To provide insights into the formulation ranges of PMMA total and the ratio of PMMA Hi to PMMA total that could provide acceptable physical and surface aesthetics properties, additional experiments were conducted by systematically varying either the contents of PMMA total (from 0 to 23%) or the ratio of PMMA Hi to total (from 0 to 100%). Tables 10 and 11 list the detailed formulations and the

TABLE 9

| Properties | Method | Unit | E1 | E2 | E3 | E4 |
|---|---|---|---|---|---|---|
| Melt Flow Rate (260° C./5 kg/300 s) | ISO 1133 | g/10 min | 15.1 | 26.9 | 10.7 | 14.0 |
| Flexural Strength | ISO 178 | MPa | — | 91 | 84.3 | 75 |
| Tensile Modulus | ISO 527 | MPa | — | 2444 | 2800 | 2500 |
| Tensile Strength @ Yield | ISO 527 | MPa | — | 60 | 56 | 57 |
| Density | ISO 1183 | g/cm$^3$ | — | 1.17 | 1.15 | 1.16 |
| HDT @ 0.45 MPa | ISO 75 | ° C. | — | 124.8 | 113.6 | 116 |
| HDT @ 1.82 MPa | ISO 75 | ° C. | — | 100.5 | 94.8 | 98 |
| Vicat Softening Temperature B50 | ISO 306 | ° C. | — | 125.8 | 108 | 113 |
| Impact Strength, Charpy, Notched @ 23° C. | ISO 179/1eA | kJ/m$^2$ | — | 16.7 | 21.9 | 32 |
| Untextured Gloss @ 60° | SABIC Internal | GU | — | 27 | 15 | 94 |
| Probability of Splay-Free Surface | SABIC Internal | — | — | 0.76 | 0.14 | — |
| Gloss from Textured Surfaces on Finished Parts | Customer Internal | % | 4% lower vs E4 | 5% lower vs E4 | 6% lower vs E4 | — |

From the data shown above (Table 9), it may be seen that the sample E2 produces the best combination of properties. The composition (sample E2) displays a melt flow rate of 24 to 30 g/10 minutes when tested at 260° C. under a 5 kilogram load for 300 seconds. The untextured gloss when measured at 60 degrees is less than 30 gloss units, specifically less than 28 gloss units and more specifically less than 27 gloss units.

The composition displays a high probability of obtaining a splay free molded surface. The probability of obtaining a splay free molded surface is greater than 0.67, specifically greater than 0.7, and more specifically greater than 0.72.

The composition further displays a heat distortion temperature when measured at 0.45 MPa as per ISO 75 of greater than 100° C., and more specifically greater than 124° C. The Vicat softening temperature (B50) when measured as per ISO 306 is greater than 124° C., and more specifically greater than 125° C. The composition further displays a Charpy notched impact strength (measured as per ISO 179/1 eA) of greater than or equal to about 15 kJ/m$^2$, and specifically greater than 16 kJ/m$^2$.

Example 2

The previous example demonstrates the positive influence of the ratio of PMMA Hi to PMMA total on the probability of obtaining a splay-free surface. This example also shows corresponding physical properties for seven experimental blends with the fixed PMMA total content (11%) but different ratios of PMMA Hi to total (0 to 100%). By visually assessing the color chips molded using these formulations, only blends with the ratio of PMMA Hi to PMMA total above 20% exhibited reasonable surface aesthetics with minimal splay. In addition, a decrease in melt flow and an increase in gloss were observed with formulations having ratios of PMMA Hi to PMMA total of above 50% (see FIGS. 2A and 2D).

TABLE 10

| # | Item | E5 | E6 | E7 | E2 | E8 | E9 | E10 |
|---|---|---|---|---|---|---|---|---|
| 1 | PC2 | 66.2 | 66.2 | 66.2 | 66.2 | 66.2 | 66.2 | 66.2 |
| 2 | SAN1 | 5.48 | 5.48 | 5.48 | 5.48 | 5.48 | 5.48 | 5.48 |
| 3 | ASA | 9.48 | 9.48 | 9.48 | 9.48 | 9.48 | 9.48 | 9.48 |
| 4 | Matt1 | 3.76 | 3.76 | 3.76 | 3.76 | 3.76 | 3.76 | 3.76 |
| 5 | Matt2 | 3.76 | 3.76 | 3.76 | 3.76 | 3.76 | 3.76 | 3.76 |
| 6 | PMMA Hi-2 | 0 | 1.1 | 2.2 | 3.3 | 5.5 | 8.25 | 11 |
| 7 | PMMA Lo-1 | 11 | 9.9 | 8.8 | 7.7 | 5.5 | 2.75 | 0 |
| 8 | STAB | 0.18 | 0.18 | 0.18 | 0.18 | 0.18 | 0.18 | 0.18 |
| 9 | MR | 0.14 | 0.14 | 0.14 | 0.14 | 0.14 | 0.14 | 0.14 |

TABLE 11

| Properties | Method | Unit | E5 | E6 | E7 | E2 | E8 | E9 | E10 |
|---|---|---|---|---|---|---|---|---|---|
| Melt Flow Rate (260° C./5 kg/300 s) | ISO 1133 | g/10 min | 27.8 | 26.6 | 24.4 | 22.1 | 20.6 | 17.2 | 14.2 |
| HDT @ 1.82 MPa | ISO 75 | ° C. | 103.2 | 103.9 | 104 | 105.3 | 105.1 | 105.1 | 105.4 |
| Impact Strength, Izod, Notched @ 23° C. | ISO 180 | kJ/m$^2$ | 9.4 | 9.3 | 10.0 | 10.5 | 10.3 | 11.4 | 11.6 |
| Untextured Gloss @ 60° | SABIC Internal | GU | 7.8 | 7.7 | 6.9 | 8.0 | 10.4 | 11.6 | 13.9 |
| Splay-Free Surface on Color Chips | SABIC Internal | — | No | No | Yes | Yes | Yes | Yes | Yes |

These properties and their variation with the amount of PMMA Hi are displayed in the FIGS. 2A through 2D. FIG. 2A shows a graph that depicts melt flow rate at different ratios of PMMA Hi to PMMA total (0 to 100%) at a fixed PMMA total content of 11 wt % in the thermoplastic composition. FIG. 2B shows a graph that depicts heat distortion temperature at different ratios of PMMA Hi to PMMA total (0 to 100%) at a fixed PMMA total content of 11 wt % in the thermoplastic composition. FIG. 2C shows a graph that depicts notched Izod impact at different ratios of PMMA Hi to PMMA total (0 to 100%) at a fixed PMMA total content of 11 wt % in the thermoplastic composition. FIG. 2D shows a graph that depicts 60 degree gloss at different ratios of PMMA Hi to PMMA total (0 to 100%) at a fixed PMMA total content of 11 wt % in the thermoplastic composition. FIGS. 2B-2D show that there is an increase in heat distortion temperature, notched Izod impact strength and gloss at 60 degrees when the amount of PMMA Hi is increased with respect to the PMMA total at a fixed value of 11 wt % in the thermoplastic composition. FIG. 2A shows that the melt flow ratio decreases with the increase in the ratio of PMMA Hi to PMMA total.

These results demonstrate that a low gloss composition with good aesthetics can be produced when the ratio of high molecular weight polymethylmethacrylate to the total weight of the high and low molecular weights polymethylmethacrylates is varied from 0.2 to 1.0, specifically 0.2 to 0.5.

Example 3

This example was conducted to demonstrate the effect of a fixed ratio of PMMA Hi to PMMA total but where the total amount of PMMA (PMMA total) was varied from 0 to 23 wt %, based on the total weight of the thermoplastic composition. Tables 12 and 13 summarize the formulations and key physical properties for seven additional experimental blends with a fixed ratio of PMMA Hi to PMMA total (30%) but varied amounts of PMMA total from 0 to 23 wt %, based on the total weight of the thermoplastic composition. For the PMMA total ranges that were explored in this experiment all corresponding blends provided an acceptable set of gloss and melt flow properties with reasonable heat and impact (see FIG. 3). Specifically, well-balanced key properties with minimized gloss and maximized heat distortion temperature and notched Izod impact strength were obtained for blends containing PMMA total from 7 to 15 wt %, based on the total weight of the thermoplastic composition.

TABLE 12

| # | Item | E11 | E12 | E13 | E2 | E14 | E15 | E16 |
|---|------|-----|-----|-----|-----|-----|-----|-----|
| 1 | PC2 | 66.2 | 66.2 | 66.2 | 66.2 | 66.2 | 63.68 | 59.68 |
| 2 | SAN1 | 16.48 | 13.48 | 9.48 | 5.48 | 1.48 | 0 | 0 |
| 3 | ASA | 9.48 | 9.48 | 9.48 | 9.48 | 9.48 | 9.48 | 9.48 |
| 4 | Matt1 | 3.76 | 3.76 | 3.76 | 3.76 | 3.76 | 3.76 | 3.76 |
| 5 | Matt2 | 3.76 | 3.76 | 3.76 | 3.76 | 3.76 | 3.76 | 3.76 |
| 6 | PMMA Hi-2 | 0 | 0.9 | 2.1 | 3.3 | 4.5 | 5.7 | 6.9 |
| 7 | PMMA Lo-1 | 0 | 2.1 | 4.9 | 7.7 | 10.5 | 13.3 | 16.1 |
| 8 | STAB | 0.18 | 0.18 | 0.18 | 0.18 | 0.18 | 0.18 | 0.18 |
| 9 | MR | 0.14 | 0.14 | 0.14 | 0.14 | 0.14 | 0.14 | 0.14 |

TABLE 13

| Properties | Method | Unit | E11 | E12 | E13 | E2 | E14 | E15 | E16 |
|---|---|---|---|---|---|---|---|---|---|
| Melt Flow Rate (260° C./5 kg/300 s) | ISO 1133 | g/10 min | 38.8 | 36.4 | 30.4 | 22.1 | 19.5 | 17.3 | 17.9 |
| HDT @ 1.82 MPa | ISO 75 | ° C. | 104.8 | 104.5 | 104.3 | 105.3 | 104.6 | 101.8 | 99.5 |
| Impact Strength, Izod, Notched @ 23° C. | ISO 180 | kJ/m$^2$ | 6.7 | 8.2 | 9.1 | 10.5 | 11.1 | 10.6 | 9.5 |
| Untextured Gloss @ 60° | SABIC Internal | GU | 12.7 | 12.2 | 10.9 | 8.0 | 9.3 | 10.2 | 12.0 |

The results are shown in the FIGS. 3A through 3D. FIG. 3A shows a graph that depicts melt flow rate at a PMMA Hi to PMMA total of 30% but where total PMMA content was varied from 0 to 23 wt % based on the total weight of the thermoplastic composition. FIG. 3B shows a graph that depicts heat distortion temperature at a PMMA Hi to PMMA total of 30% but where total PMMA content was varied from 0 to 23 wt % based on the total weight of the thermoplastic composition. FIG. 3C shows a graph that depicts notched Izod impact strength at a PMMA Hi to PMMA total of 30% but where total PMMA content was varied from 0 to 23 wt % based on the total weight of the thermoplastic composition. FIG. 3D shows a graph that depicts 60 degree gloss at a PMMA Hi to PMMA total of 30% but where total PMMA content was varied from 0 to 23 wt % based on the total weight of the thermoplastic composition.

From these results, it may be seen that when the first polymethylmethacrylate and the second polymethylmethacrylate are present in a total amount of 0 to 25 wt %, preferably 7 to 15 wt %, based on the total weight of the thermoplastic composition well-balanced key properties such as minimized gloss, maximized heat distortion temperature and notched Izod impact strength may be obtained.

It is to be noted that all ranges detailed herein include the endpoints. Numerical values from different ranges are combinable. The transition term comprising encompasses the transition terms "consisting of" and "consisting essentially of." The term "and/or" includes both "and" as well as "or." For example, "A and/or B" is interpreted to be A, B, or A and B.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A composition comprising:
   a polycarbonate;
   a copolymer derived from a copolymerization of a vinyl aromatic monomer and an ethylenically unsaturated nitrile monomer;
   an impact modifier that comprises acrylonitrile-styrene-acrylate;
   a first gel-type low gloss additive; where the first gel-type low gloss additive is an epoxy cross-linked styrene acrylonitrile dispersed in polycarbonate;
   a second gel-type low gloss additive; where the second gel-type low gloss additive is an epoxy cross-linked styrene acrylonitrile dispersed in polystyrene;
   a first polymethylmethacrylate; and
   a second polymethylmethacrylate; where the first polymethylmethacrylate and the second polymethylmethacrylate are present in a total amount of 1 to 25 wt %, based on the total weight of the composition; and wherein a weight ratio of the first polymethylmethacrylate to a total weight of the first polymethylmethacrylate and the second polymethylmethacrylate is 0.2 to 1.0; and where the first polymethylmethacrylate has a higher melt viscosity than the second polymethylmethacrylate.

2. The composition of claim 1, where the polycarbonate is present in an amount of 30 to 80 wt %, based on the total weight of the composition.

3. The composition of claim 1, where the polycarbonate comprises a first polycarbonate and a second polycarbonate; and where the first polycarbonate has a different molecular weight from the second polycarbonate.

4. The composition of claim 1, where the copolymer derived from the copolymerization of a vinyl aromatic monomer and an ethylenically unsaturated nitrile monomer is a styrene acrylonitrile copolymer.

5. The composition of claim 4, where the styrene acrylonitrile copolymer is present in an amount of 2 to 20 wt %, based on the total weight of the composition.

6. The composition of claim 1, where the acrylonitrile-styrene-acrylate is present in an amount of 8 to 39 wt %, based on the total weight of the composition.

7. The composition of claim 1, where the first polymethylmethacrylate is present in an amount of 2 to 18 wt %, based on the total weight of the composition.

8. The composition of claim 1, where the first polymethylmethacrylate comprises a copolymer of polymethylmethacrylate and polybutylacrylate.

9. The composition of claim 1, where the second polymethylmethacrylate is present in an amount of 2 to 20 wt %, based on the total weight of the composition.

10. The composition of claim 1, where a molded composition displays a splay free molded surface.

11. The composition of claim 1, where a molded composition displays an untextured gloss when measured at 60 degrees of less than 30 gloss units.

12. The composition of claim 1, where a molded composition displays an untextured gloss when measured at 60 degrees of less than 30 gloss units; a heat distortion temperature when measured at 0.45 MPa as per ISO 75 of greater than 100° C., and a Charpy notched impact strength (measured as per ISO 179/1eA) of greater than or equal to about 15 kJ/m$^2$.

13. An article manufactured from the composition of claim 1.

14. A method comprising:
    blending a composition comprising:
    a polycarbonate;
    a copolymer derived from a copolymerization of a vinyl aromatic monomer and an ethylenically unsaturated nitrile monomer;
    an impact modifier that comprises acrylonitrile-styrene-acrylate;
    a first gel-type low gloss additive; where the first gel-type low gloss additive is an epoxy cross-linked styrene acrylonitrile dispersed in polycarbonate;
    a second gel-type low gloss additive; where the second gel-type low gloss additive is an epoxy cross-linked styrene acrylonitrile dispersed in polystyrene;
    a first polymethylmethacrylate; and
    a second polymethylmethacrylate; where the first polymethylmethacrylate and the second polymethylmethacrylate are present in a total amount of 7 to 25 wt %, based on the total weight of the composition; and wherein a weight ratio of the first polymethylmethacrylate to a total weight of the first polymethylmethacrylate and the second polymethylmethacrylate is 0.2 to 0.7; and where the first polymethylmethacrylate has a higher melt viscosity than the second polymethylmethacrylate.

15. The method of claim 14, where the blending comprises melt blending.

16. The method of claim 14, further comprising injection molding the composition.

* * * * *